United States Patent [19]

Hoban et al.

[11] Patent Number: 5,054,868
[45] Date of Patent: Oct. 8, 1991

[54] ARMORED OPTICAL FIBER CABLE INTERCONNECTION FOR DUAL PAYOUT SYSTEMS

[75] Inventors: Fay A. Hoban; Harold S. Duff; Andrew W. Marten, all of Ridgecrest, Calif.

[73] Assignee: The United States of America as represented by the Secretary of the Navy, Washington, D.C.

[21] Appl. No.: 576,250

[22] Filed: Aug. 29, 1990

[51] Int. Cl.⁵ .................................. G02B 6/36
[52] U.S. Cl. .............................. 385/99; 385/95
[58] Field of Search ............... 350/96.2, 96.21, 96.23

[56] References Cited

U.S. PATENT DOCUMENTS

| | | | |
|---|---|---|---|
| 4,252,405 | 2/1981 | Oldham | 350/96.23 |
| 4,516,830 | 5/1985 | Guazzo | 350/96.21 |
| 4,846,545 | 7/1989 | Estabrook et al. | 350/96.23 |

Primary Examiner—John D. Lee
Assistant Examiner—Stephen W. Barns
Attorney, Agent, or Firm—Sol Sheinbein; Melvin J. Sliwka; Harvey A. Gilbert

[57] ABSTRACT

An armored optical fiber cable interconnection and method of making the interconnection with a self-sealing, low-strength joint with relatively low optical attenuation, has an inner fiber carrying jacket, an outer protective jacket, and an intermediate armored jacket of stranded material. The interconnection ends are assembled with a doubled layer of armored jacket over an intermediate protective jacket portion all sealed and held in place with a length of shrink tubing over the jackets and a retaining bead with an o-ring fitting over the assembly and against the shrink tubing over the retaining bead.

18 Claims, 3 Drawing Sheets

ARMORED OPTICAL FIBER CABLE INTERCONNECTION FOR DUAL PAYOUT SYSTEMS

BACKGROUND OF THE INVENTION

The present invention relates to an armored interconnection for optical cable and pertains, more particularly, to an armored interconnection providing a single low strength splice for an optical cable directed to a dual payout system optical fiber data link between an aircraft and missile. The armored interconnection of this invention is an improvement over and has advantages to the conventional multiple high strength splices, and provides substantially the same structural integrity and low optical attenuation characteristics.

With conventional high strength fiber optic cables it is generally necessary to provide a standard commercially available section of jacketed materials including a KEVLAR brand strength member. The strength member is typically modified and spliced between two payout bobbins with two high strength splices. This configuration requires multiple splices to attach the armored section to the payout bobbins.

Another drawback associated with the conventional fiber splice arrangement is that these very expensive and labor intensive splices often require numerous splice attempts in order to obtain one acceptable splice. As the fiber is unwound to accomplish the splices a number of loose coils of fiber are created on the bobbins. These loose coils have the drawback in that they tend to cause optic fiber failures during the initial fiber payout as the fiber unwinds High strength fiber splices have as additional drawbacks the tendency to be unreliable for a number of other reasons. For example due to excess handling, and reduction in strength at a heat affected zone that occurs in a fiber as a result of the splicing process. These and other drawbacks associated with obtaining reliable high strength splices are contributing factors to the inability or difficulty to find individuals or companies willing to attempt to overcome the inherent drawbacks.

SUMMARY OF THE INVENTION

Accordingly, it is an object of the present invention to provide an armored optical fiber cable interconnection for dual payout systems that is adapted to be used as a strength member to join and protect an optical fiber data link between an aircraft and missile payout system during captive and free flight missions. In general, the cable of this invention provides a reinforced joint suitable for use between relatively moving launch platforms and weapons, including but not limited to the aircraft launched embodiment disclosed and illustrated herein.

Another object of the present invention is to provide an armored optical fiber cable interconnection for dual payout systems that is constructed to replace multiple high strength splices with a single low strength splice which has approximately the same structural integrity and low optical attenuation characteristics.

A further object of the present invention is to provide an armored optical fiber cable interconnection for dual payout systems that is adapted to provide an armored cable design without conventional high strength splices.

Still another object of the present invention is to provide an armored optical fiber cable interconnection for dual payout systems that may be accomplished with a single and relatively inexpensive, low strength arc fusion splice. The cable of this invention is preferably designed to seal and reinforce the cable in the region of the splice so as to protect and maintain the integrity of the fiber optic joint and the KEVLAR brand strength member.

Still a further object of the present invention is to provide an armored optical fiber cable interconnection for dual payout systems that is adapted for self-sealing without any specialized sealing requirements.

Another object of the present invention is to provide an armored optical fiber cable interconnection for dual payout systems that does not require the use of specialized handling equipment or tools for assembly.

A further object of the present invention is to provide an armored optical fiber cable interconnection for dual payout systems that is flexible and adaptable for modification for various diameters, lengths, and other conventional dynamic and aerodynamic design considerations.

Another object of the present invention is to provide an armored optical fiber cable interconnection for dual payout systems that will be recognized by those skilled in the art to have potential for additional military and commercial applications.

To accomplish the foregoing and other objects of this invention there is provided an armored optical fiber cable interconnection for dual payout systems for connecting, protecting, and maintaining the continuity and integrity of a fiber optics data link between two payout bobbins during aircraft and missile operation. The armored interconnection comprises a plurality of layered coverings or jackets, including an outer protective layer and an armored inner layer relative to the protective outer layer.

An access opening is provided in the outer protective layer intermediate its ends. Access is provided into the interior of the armored interconnection through which a splice is made in the optic fiber being connected. A splice is accomplished and the opening is covered by a closure member. A retaining means is provided at each end of the interconnection for retaining an end assembly of doubled over armored layer portion at each end of the interconnection and protective outer layer.

A gasket means is provided for restraining the respective inner armored layer, protective outer layer and closure means assembly and sealing the end assembly. In the disclosed embodiment described herein the interconnection comprises an inner fiber carrying Hytrel brand jacket, an intermediate stranded armored jacket of Kevlar brand material, and an outer protective polyurethane jacket.

The interconnection length between retaining means is approximately 1.8 times the distance between a free length of the fiber optic cable extending between fiber bobbins used in a launched weapon system. A method of constructing an armored interconnection for an optic fiber cable is also disclosed.

These and other objects and features of the present invention will be better understood and appreciated from the following detailed description of one embodiment thereof, selected for purposes of illustration and shown in the accompanying drawings.

DETAILED DESCRIPTION

Figure 1:
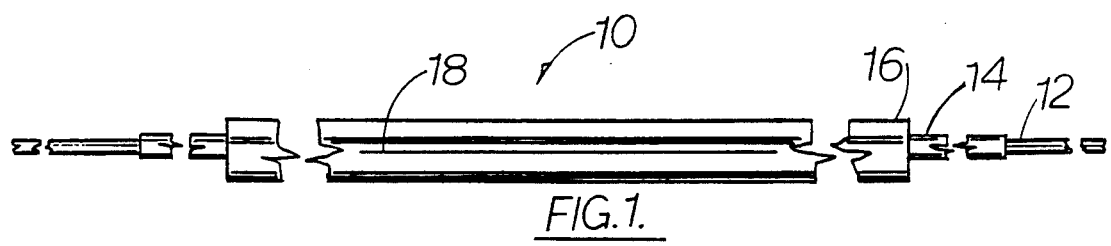
FIG. 1 is a plan view of a service loop portion of armored cable interconnection prepared in accordance

Referring now to the drawings there is shown a preferred embodiment for the armored optical fiber cable interconnection for dual payout systems. The armored interconnection is described in conjunction with a dual bobbin payout system for use with a control data pod for a particular aircraft and launched missile system.

The armored interconnection of the present invention is particularly adapted for connecting, protecting, and maintaining the continuity and integrity of a fiber optics data link between the two payout bobbins installed in the control data pod on the aircraft and the weapon.

The drawings show an armored fiber optic cable service loop 10 in conjunction with a splice for use in a payout system that comprises an inner fiber carrying jacket 12 enveloping the optical fiber, an intermediate armored jacket 14, and an outer protective jacket 16.

Figure 3:
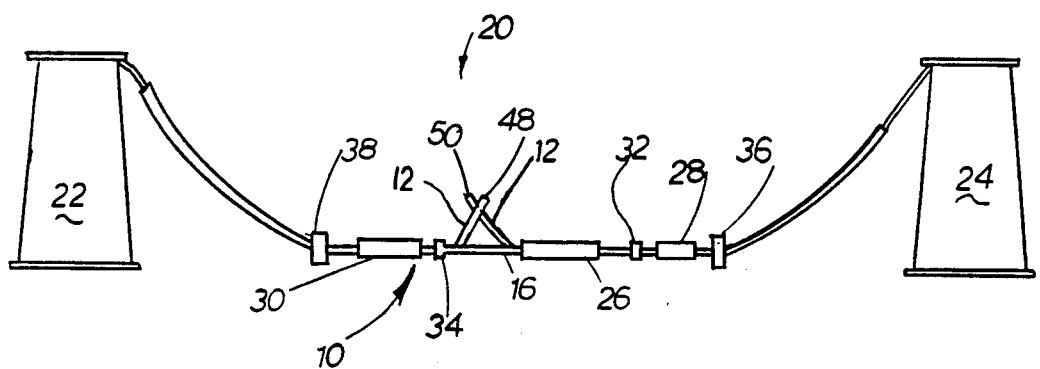
FIG. 3 is a schematic representation of a splicing assembly incorporating the present invention.
Figure 7:
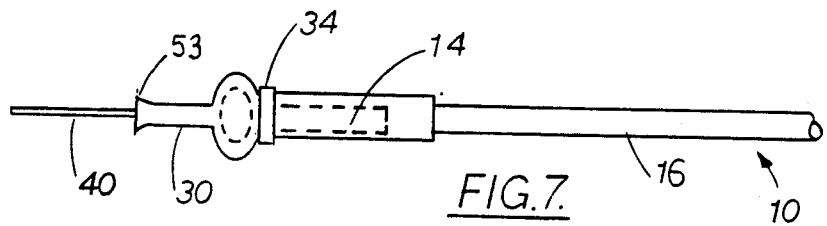
FIG. 7 is a plan view depicting details of the connection between a length of shrink tubing and a connection retainer bead.

A splicing arrangement 20 shown in FIG. 3 illustrates a preferred embodiment for accomplishing the armored interconnection of the present invention. The illustrated splicing arrangement is shown in relation to one fiber bobbin 22 and another fiber bobbin 24. The splice accomplished with this invention in combination with the service loop 10 and service loop end assemblies 11, shown in FIG. 7, will provide a desired armored interconnection between these two bobbins that will maintain the data link between a weapon and control pod (not shown) with the bobbins installed therein and connected to the associated mechanisms.

As will become apparent, and as shown in FIG. 3, the armored interconnection for the splice further comprises an intermediate shrink tubing portion 26, one end shrink tubing portion 28, and another end shrink tubing portion 30. Additional apparatus used to complete the interconnection comprise gasket means, here an o-ring 32 and another o-ring 34, and retaining means, here a retainer bead 36 and another retainer bead 38.

Figure 4:
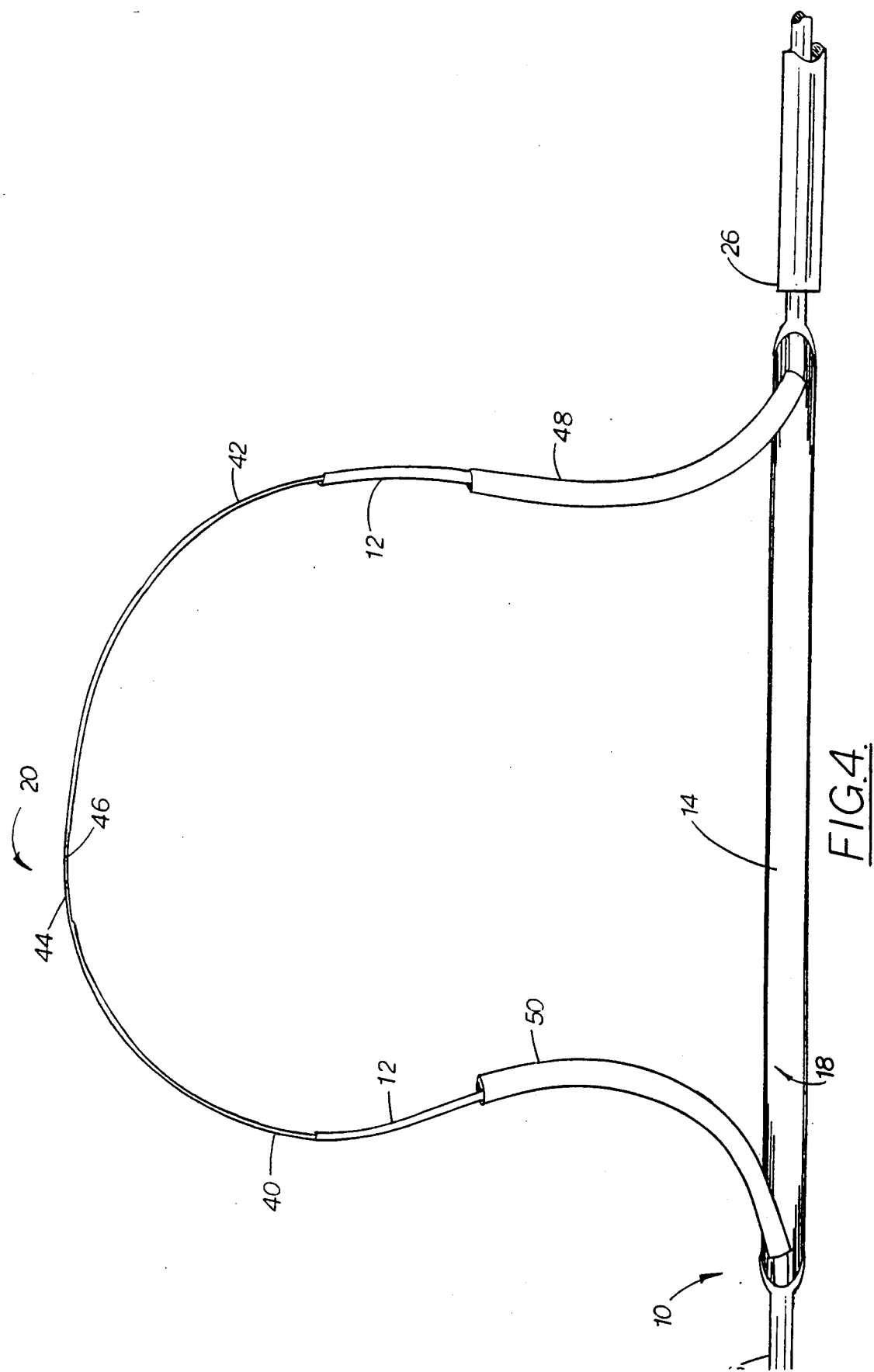
FIG. 4 is a schematic representation of a splice accomplished in accordance with this invention.
Figure 5:
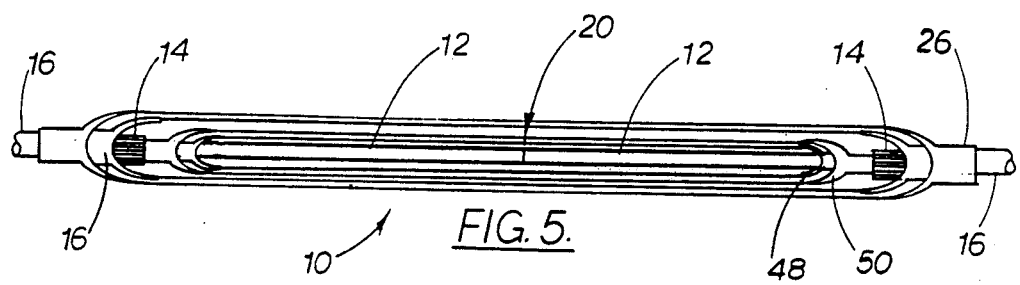
FIG. 5 is an exaggerated plan view of a splice with shrink tubing constructed in accordance with the present invention in which portions of the jackets and shrink tubing are shown partially removed.
Figure 6:
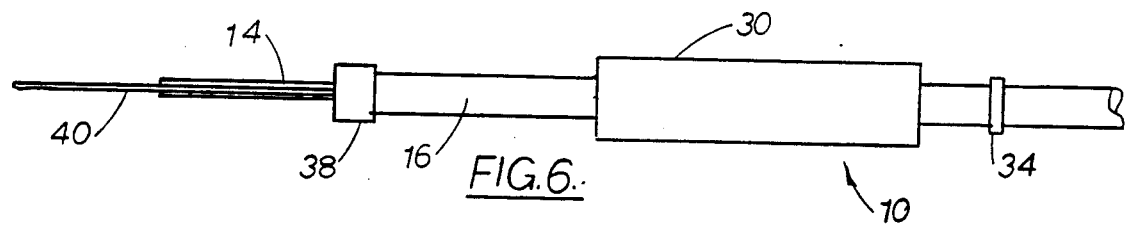
FIG. 6 is a plan view depicting a length of shrink tubing prior to the splice.

The fiber optic splice protected by the armored interconnection 10 comprises a pair of opposing portions of buffered optic fiber 40 and 42 shown in FIG. 4 and a pair of opposing bare ends 44 and 46 of optic fiber. The splice is covered by a splice inner shrink tubing portion 48 and a splice outer shrink tubing portion 50, as shown in FIGS. 4 and 5.

In operation, in connection with the optic fiber data link splice between fiber bobbins previously mentioned and to manufacture an armored interconnection between the bobbins of a particular embodiment dual payout system, the length between the control data pod and the weapon must be determined. This distance determines the distance between retainer beads 36 and 38 as shown in FIG. 3. The conventional calculation for this distance is approximately 1.8 times the distance between the control data pod and the weapon.

Using one particular aircraft environment as one preferred embodiment for this invention, the distance between wing station 1, 2 and 7, 8 is known to be approximately forty inches. The 1.8 factor determines a distance of seventy-two inches between retainer beads 36 and 38 on the splice in the service loop 10. Approximately four feet of excess length of inner fiber carrying jacket 12 for the service loop 10 is typical for a conventional splice and applies to the present invention as well. Again, the multiplier factor will depend on the particular aircraft involved.

It will be understood that the present invention does not alter many of the conventional calculations and techniques associated with presently available splices. It will be further understood that the service loop 10 is preferred with a splice rather than a conventional mechanical connector (not shown).

Continuing with a description of the present invention, the service loop 10 described herein uses a conventional simplex cable as manufactured by Optical Cable Corporation, part number AO-1-030E-S1XC/1XD-900 and contains an ALCATEL single mode 300KPSI Bend Insensitive Optical Fiber. The particular optical fiber used is of no consequence with respect to the present invention since the optical fiber originally resident in the service loop 10 is removed from there in fabricating the present invention.

A length of approximately fourteen of service loop 10 is used in the following description of a preferred embodiment of the present invention.

Splitting the outer protective jacket 16 at either end of the service loop 10 and stripping it from the underlying intermediate armored jacket 14 exposes a portion of the armored strands. The outer protective jacket 16 is easily stripped once the ends are split and pulled apart. Typically, when following the teaching of the present invention, the original optical fiber portion of the cable is still within the service loop 10. Removing a portion of the armored strands exposes a portion of the inner fiber carrying jacket 12 protruding from each end of the service loop 10.

The center of the service loop 10 is located and a slit 18 is accomplished through the outer protective jacket 16 on diametrically opposed sides of the service loop. The inner fiber carrying jacket 12 is located through the slit 18 and creating a slight slack allows the bisecting of the jacket 12 and the optical fiber therein. The jacket 12 is bisected carefully with the optical fiber therein left undisturbed and providing support to the surrounding jacket 12 to avoid flattening or otherwise disturbing the now free ends.

Removing the optical fiber from the inner fiber carrying jacket 12 is accomplished so as not to distort or stretch the jacket. If the jacket 12 is distorted or its inside diameter is changed due to stretching when removing the optical fiber, then the above steps must be repeated with a new service loop 10. A portion of each bisected end of the jacket 12 is pulled through the slit 18.

Shrink tubing portions 28 and 30 are introduced over each end of the service loop 10. The intermediate shrink tubing portion 26 is threaded over an end portion of the service loop 10 to prepare for the completion of the splice. Gasket means, here the "O" rings 22 and 34, are then threaded over the ends of the service loop 10 and the shrink tubing portions followed by retaining means and end protective sleeves. The arrangement of the present invention of a preferred embodiment is depicted in FIGS. 3 through 7.

Two bobbins 22 and 24 of optical fiber data link are prepared for splicing and inspected for fiber anomalies or other conditions that could cause fiber failure during payout. The optical fiber is prepared for splicing by peeling a working length of fiber from each bobbin.

Figure 2:
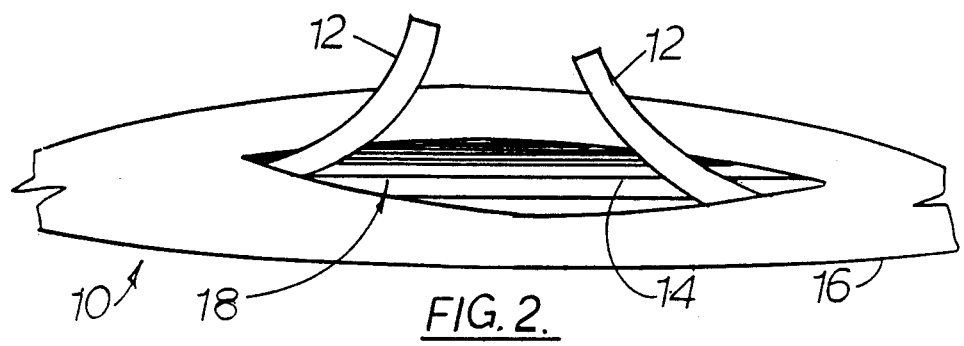
FIG. 2 is a partial perspective view of the armored cable service loop depicted in FIG. 1 showing a tubing portion pulled through a slit in an outer jacket.

Feeding fiber from the bobbins 22 and 24 into the exposed outer ends of the now empty inner fiber carrying jacket 12 begins the splicing portion of the present invention. The fiber is fed into the jacket 12 until fiber extends out of the inner or bisected ends of the jacket 12 protruding through the slit 18 in FIG. 2. The jacket 12 is now close but not in contact with the point on each bobbin at which the fiber was peeled. Securing each portion of jacket 12 to the end of each respective bobbin 22 and 24 prevents further unwinding of fiber from the bobbins.

Installing a splice inner shrink tubing portion 48 and a splice outer shrink tubing portion 50, one over each length of the buffered optic fiber 42 and 40, respectively, prepares the assembly illustrated in FIGS. 3 and 4 for the final steps of this invention.

Stripping the buffer from optic fibers 40 and 42 and exposing the bare optic fiber ends 44 and 46 prepares the fiber for conventional splicing according to any relevant instructions. After the splicing operation the buffer is reconstituted over the bare fiber. Pulling the fiber at the outer ends of the inner fiber carrying jacket 12 subsequent to splicing pulls the fiber into the jacket 12 through the slit 18. Care should be taken to avoid disturbing the fiber on the bobbins so as to cause more fiber to unwind from either of the bobbins.

The reconstituted, that is rebuffered and spliced optical fiber and a portion of adjacent buffered fiber are pulled into one end or the other of the inner fiber carrying jacket 12 at the slit 18. The other end of the jacket 12 at the slit 18 is brought together in abutting relationship with the end of the jacket enclosing the fiber splice. All reconstituted optic fiber is now encased. The bisected ends of the jacket 12 are abutted to within 1/32 inch of each other without disturbing the splice now located within the jacket approximately three-quarters of an inch to one inch from the butt joint. Caution at this step is important since the fiber will break if the butt joint buckles.

Sliding the inner shrink tubing portion 50 over the butt joint, and centering the tubing over the splice, with the shrink tubing bias towards the jacket 12 enclosing the fiber splice prepares the shrink tubing for shrinking over the butt joint. Sliding the outer shrink tubing portion 48 and generally centering it over the inner shrink tubing portion 50 prepares the shrink tubing portion 48 for shrinking over the butt joint in the jacket 12 and the inner shrink tube portion 50. This assembly of butt joint and double layer of shrink tubing is carefully pulled back into the slit 18. The shorter length of shrink tubing portion 48 is placed over the longer length shrink tubing portion 50 to assure centering of portion 48 over portion 50 by setting equal lengths of portion 50 extending from each end of portion 48.

Checking the fiber optic splice and bobbin optical fiber by conventional techniques assures that the splice is operable and the bobbin fiber has not been damaged. Shrinking intermediate shrink tubing portion 26 over the slit 18 seals the slit in the service loop 10. The service loop is now almost complete.

Folding the intermediate armored jacket 14 back over the retaining beads 36 and 38 at the ends of the service loop 10 allows the service loop end shrink tubing portions 28 and 30 to be placed over the retaining beads and the intermediate armor jacket 14 folded back over the beads. See FIG. 6 and 7. The jacket 12 extends past the ends of the shrink tubing portions 28 and 30. Care should be taken to assure that slack does not form in the folded back intermediate armor jacket 14 ends enclosed by the tubing portions 28 and 30.

Sliding the respective gasket means, in this case the "O" rings, 32 and 34 into a generally abutting relationship with the retaining means, here the retainer beads 36 and 38, completes construction of the service loop 10 of the present invention.

In a preferred embodiment the inner fiber carrying jacket 12 is a Hytrel brand tubing and the outer protective jacket 16 is a polyurethane material. In the depicted embodiment the outer protective jacket 16 is split approximately one-quarter inch from each end of the service loop 10. The outer protective jacket 16 is stripped away from the inner armored layer 14 approximately forty-eight inches from each end exposing approximately forty-eight inches of the stranded Kevlar intermediate armored jacket 14 and the underlying Hytrel inner jacket 12 at each end of the service loop 10.

Approximately seventy-two inches of polyurethane outer protective jacket 16 remains intermediate the 48 inch ends of the service loop 10. Cutting away approximately forty-six inches of the stranded Kevlar intermediate armored jacket 14 from each end of the service loop 10 will leave approximately two (2) inches of the Hytrel inner fiber carrying jacket 12 protruding from each end of the service loop 10.

Locating the approximate center of the seventy-two inch portion of polyurethane outer protective jacket 16 in the service loop 10 and slitting the jacket 16 on diametrically opposed sides of the service loop for approximately two inches on each side of the center for each four (4) inch long slit allows access to the Kevlar strands of the intermediate armored jacket 14 and the Hytrel inner fiber carrying jacket 12. The careful use of a sharp blade allows the desired cut without disturbing the Kevlar strands or cutting the inner Hytrel jacket 12.

Locating the Hytrel jacket 12 through the four inch slit in the center of the service loop 10 allows the Hytrel to be separated from the Kevlar intermediate armored jacket 14 and a slack taken up of approximately one or two inches. Bisecting the Hytrel jacket 12 with the sharp blade cuts the Hytrel and the optical fiber within the jacket 12.

Removing the optical fiber is the next step of the preferred embodiment and is accomplished by measuring back approximately one-quarter inch from an outside end of each four foot length of the Hytrel jacket 12. Nicking the Hytrel inner jacket 12 with a suitable pair of 0.014 no-nick wire strippers provides a piece of the jacket 12 to remove at each end that is approximately one-quarter inch long. Grasping this piece of tubing and carefully pulling exposes a portion of the optical fiber approximately one-quarter inch in length.

Securing the jacketed portion of the service loop 10 with tape, for example, to a work bench edge in a straight fashion prepares the jacket for removal of the optical fiber. Grasping the exposed end of the optical fiber away from the slit 18 and gently holding the Hytrel inner fiber carrying jacket 12 extending from the slit 18 straight within the outer protective jacket 16 allows the fiber to be pulled out.

Pulling both opposing ends of the now empty Hytrel tubing jacket 12 further through the slit 18 is accomplished until approximately six to seven inches of tubing are exposed through the slit. Care is required at this juncture since sometimes the Hytrel tubing will slide easily through the polyurethane outer protective jacket 16 and the stranded Kevlar intermediate armored jacket 14 and at other times the Hytrel tubing may be hard to pull through.

The Hytrel jacket tubing should not be pulled too hard as this can stretch the tubing, thereby causing the diameter to shrink at the stretched portions. If the tubing is stretched, then the particular service loop is ruined and the procedure must be started over from the first step.

It has been observed that upon encountering a section of tubing that appears tight and certain to stretch if pulled hard enough to pull through as desired, pulling on the polyurethane outer protective jacket 16 in one direction and the Hytrel inner fiber carrying jacket 12 in the opposite direction through the slit 18, the inner jacket 12 tube may loosen sufficiently to allow it to be pulled through as desired.

The next step includes threading a section or portion of approximately six inch long by three-sixteenths inch diameter (nominal) intermediate shrink tube portion 26 that will provide the cover for the slit 18 intermediate the ends of the service loop 10. The o-rings 32 and 34 (MS28775-007 or its equivalent) and the aluminum retainer beads 36 and 38 are threaded over opposite ends of the service loop 10. Two sections of shrink tube 28 and 30 three inches long by three-sixteenths inch diameter (nominal) are also threaded over the ends of the service loop.

The three sections or portions of shrink tube now threaded over the service loop 10 are preferably of RNF-100, type 1 Thermofit brand manufactured by RAYCHEM. The full shrink tube specification may be expressed as RNF-100 3/16 M63 YO 26667-03 or its equivalent.

Conventional optical handling techniques should be used, for example the use of clean white cotton gloves, when handling the optical fiber itself. The peel point or exposed stub should be located at the aft end or payout end of the bobbin between approximately two and six turns of fiber on each bobbin 22 and 24 peeling off what commonly referred to as "easy way peel". Fiber may have to be carefully stripped from a bobbin to accomplish these conditions prior to fiber splicing.

The now peeled and free lengths of fiber are fed through ends of the now empty Hytrel tubing inner fiber carrying jacket 12 at the outside ends of the service loop 10 until approximately sixteen inches of the fiber protrude from the ends of tubing jacket 12 extending from the slit 18. The outside ends of the Hytrel tubing are preferably approximately one inch or less from the respective peel points of each fiber from its bobbin.

The aft ends of each bobbin 22 and 24 should have a conventional lip (not shown) to which the opposing ends of the Hytrel tubing jacket 12 is taped so as to prevent further fiber payout. In a preferred embodiment applying a small triangular shaped tab of an adhesive tape, approximately one-eighth to five-thirty seconds inch on a side assists to maintain the fixed fiber condition.

Extending the length of fiber protruding from the Hytrel tubing inner fiber carrying jacket 12 at the slit 18 between approximately sixteen to eighteen inches prepares the fiber for the next step. If the extending fiber is longer than this, it is preferred to cut the fiber back to approximately the preferred length.

The inner and outer shrink tubing portions 50 and 48, respectively, are an approximately four inch long section of the smaller diameter and an approximately three and three-quarter inch section of the larger diameter Kynar-HS brand shrink tube. The inner portion 50 is a 3/64 inch AWG size clear, and the outer portion 48 is a 1/16 inch AWG size clear. The shrink tube portions are slipped over the ends of the exposed buffered fibers 40 and 42 for later use in enclosing the finished splice and adjacent near-abutting ends of the Hytrel tubing inner jacket 12 proximate the slit 18.

The approximately sixteen to eighteen inches of fiber are now prepared and their splicing continues, first insuring that the inner and outer shrink tubing portions 50 and 48, respectively are still properly positioned. One conventional fiber splicing technique will now be described in detail. The fiber splicing is accomplished prior to completion of the armored interconnection and other fiber splicing techniques may be used without deviating from the present invention.

Wearing white cotton gloves, the technician now proceeds with the completion of the fiber optic splice enclosed within the service loop 10 of the present invention. Stripping the buffer off each opposing end 44 and 46 of the fiber with a solvent, for example dichloromethane, to yield approximately one and one half inches of bare fiber is followed by rinsing the fiber ends 44 and 46 in ethanol or an equivalent.

Consulting the particular cleaving and splicing instructions the technician proceeds with splicing according to conventional relevant splicing instructions, for example, as known for use with an arc fusion splice technique. After completing the splice the buffer is reconstituted over the bare fiber to the original condition.

Pulling the fiber out of the service loop 10 by pulling the ends away form the slit 18 towards the respective bobbins 22 and 24 causes the now spliced fiber to reenter the ends of the Hytrel tubing of the inner fiber carrying jacket 12 at the slit 18. Care will be taken not to unwind any additional fiber from the bobbins. The splice and approximately three-quarters of an inch of rebuffered fiber on either side of the splice will now be pulled into one end or the other of the Hytrel tubing inner jacket 12.

The bisected ends of the Hytrel tubing inner jacket 12 are now carefully brought to approximately 1/32 inches of each other to juxtaposition and totally encase the spliced fiber ends 44 and 46. The splice is set into one end of the Hytrel tubing inner jacket 12 on one side or the other of the 1/32 inch juxtaposition. Both ends of the Hytrel tubing are held as straight as possible since care must be taken not to break the fiber.

Sliding the 3/64 inch AWG inner shrink tubing portion 50 over the juxtaposed ends 44 and 46 is accomplished while biasing the shrink tubing portion 50 over the Hytrel tube portion enclosing the fiber splice. In a preferred embodiment approximately three-quarter inches more are pulled over the fiber splice before shrinking the tube over the 1/32 inch gap butt joint. It will be understood that the shrunken portion should be maintained as straight as possible. Sliding the 1/16 inch AWG outer shrink tubing portion 48 over the now shrunken inner tubing portion 50 positions outer shrink tubing portion 48 for shrinking.

In a preferred embodiment the inner shrink tubing portion 50 leaves approximately one-eighth to one quarter inch protruding from each end of the outer shrink tubing portion 48. Pulling Hytrel tubing jacket 12 carefully at the outer ends of the service loop returns the inner and outer shrink tubing portions 50 and 48 inside the slit 18 in the polyurethane outer protective jacket 16.

Checking the bobbin assembly with a conventional Optical Time Domain Reflectometer (OTDR) technique assures that the bobbin fiber and the splice meet required optical transmission requirements or standards. Shrinking the six inch by three-sixteenth inch diameter intermediate shrink tubing portion 26 evenly over the approximately four inch slit 18 in the polyurethane outer protective jacket 16 seals the intermediate opening in the service loop 10. The intermediate shrink tubing portion 26 is not shrunk in place until the OTDR or other suitable readings have shown to the satisfaction of the technician that the splice is a good one.

Should the splice prove to be unsatisfactory, then the splice can be removed from the slit 18 and cut out and a new fiber splice installed. Thus, prior to shrinking intermediate shrink tubing 26, the entire service loop 10 need not be automatically discarded if a problem arises with the optical data link capabilities of the optical fiber splice or the bobbins. One need only repeat the steps up to shrinking the intermediate shrink tubing portion 26.

Folding the Kevlar strands of the intermediate armored jacket 14 ends away from the slit 18 back over the aluminum retainer beads 36 and 38 and installing the end shrink tubing portions 28 and 30 are the next to the last step of the present invention. In a preferred embodiment the three inch by three-sixteenth inch shrink tubing portions are shrunk over the aluminum retainer beads 36 and 38 in the following manner. The aluminum retaining beads 36 and 38 are located at the ends of the polyurethane outer protective jacket 16 on the service loop 10. The retainer beads 36 and 38 are preferably even with the ends of the jacket such that none of the jacket 16 protrudes outward of the retaining beads.

Folding the Kevlar strands of the intermediate armored jacket 14 back over the aluminum retainer beads 36 and 38 and distributing them evenly around the retainer beads is followed by extending the three-sixteenth inch shrink tubing portions 28 and 30 approximately five-eighths inch past the retaining beads to the outside of the beads. Shrinking the tubing portion 30 is accomplished while care is taken not to concentrate heat on the Hytrel tubing inner fiber carrying jacket 12 extending out of the shrink tubing at either end. Heat is applied from the center of the length of tubing portion 30 and 28 towards its edges so that it totally enwraps the armored jacket covered retainer bead 36 and 38 and the outer protective jacket 16, snugly and completely, and from its center towards but not to its free end in the direction of the nearest bobbin so that a flared portion 53 is created. The flared portion 53 allows unobstructed movement of the optical fiber 14 as it exits the service loop 10 on its way to the bobbins 22 and 24. The prior steps are accomplished without allowing slack to form in the Kevlar strands under the three inch shrink tubing at either end of the service loop 10.

The o-rings 32 and 34 are moved up and over their respective proximate shrink tubing portions 28 and 30 and up to and in juxtaposition with the aluminum retainer beads 36 and 38 to complete construction of a preferred embodiment of the service loop 10 of the present invention.

The spliced bobbin pair 22 and 24 are stored until installation into the weapon and control pod for providing a dual payout fiber optic data link system.

From the foregoing description those skilled in the art will appreciate that all of the objects of the present invention are realized. An armored optical fiber interconnection cable for dual payout systems has been shown and described for providing the desired armored data link in a dual payout fiber optic control system. The armored interconnection provides a strength member to join and protect an optical fiber data link between an aircraft and missile payout system during captive and free flight missions.

The service loop constructed as described provides a reinforced joint suitable for use between relatively moving launch platforms and weapons, including but not limited to the aircraft launched embodiment disclosed and illustrated herein. The single low strength splice provided by the service loop has approximately the same structural integrity and low optical attenuation characteristics of conventional multiple high strength splices.

The single and relatively inexpensive arc fusion splice replaces the relatively more expensive and more difficult high strength conventional splices. The service loop 10 seals and reinforces the cable in the region of the splice so as to protect and maintain the integrity of the fiber optic joint and the KEVLAR brand intermediate armored jacket 14. No specialized sealing requirements, techniques, or tools are required to accomplish the armored interconnect of the present invention.

The service loop constructed in accordance with the present invention is flexible and may be readily adapted for various diameters, lengths, and other conventional dynamic and aerodynamic design considerations with respect to dual payout fiber systems or other commercial fiber optic systems where it is desired to provide an armored interconnect for a fiber splice.

While specific embodiments have been shown and described, many variations are possible. The particular makeup of the various layers of the service loop including all of the diameters and dimensions may be changed as desired to suit the equipment or the conditions with which it is used. The layer and fiber materials may vary although Kevlar, Hytrel and polyurethane is preferred for many applications. The materials and bobbin arrangement may vary although the preferred embodiment shows conventional military components for a military application.

In a more simplified embodiment of the invention the interconnect may be between two fixed fiber optic lines in which a splice also requires an armored interconnection and must be capable of surviving under severe service conditions.

Having described the invention in detail, those skilled in the art will appreciate that modifications may be made of the invention without departing from its spirit. Therefore, it is not intended that the scope of the invention be limited to the specific embodiments illustrated and described. Rather, it is intend that the scope of this invention be determined by the appended claims and their equivalents.

What is claimed is:

1. An armored interconnection for an optic fiber cable, comprising:
   an interconnection defined by a plurality of layered coverings, including an outer protective jacket and an intermediate armored jacket relative to the outer protective jacket, the interconnection having one end portion and another opposite end portion, the interconnection defining an opening intermediate the end portions for providing access to the interior of the interconnection, an end portion of the intermediate armored jacket extending towards its opposing end portions and over the outer protective jacket;
   means for carrying an optical fiber enclosed within the interconnection;
   opposing lengths of optical fiber carried within the carrying means, one length of optical fiber extending through the interconnection from one end portion and another length of optical fiber extending from the other end portion;
   splice means connecting the optical fiber, the splice means located proximate the interconnection opening;
   retaining means for retaining the intermediate armored jacket portion at each end of the interconnection, the retaining means located at the one end and the other end, the retaining means enclosed within each opposite extending intermediate armored jacket;
   a plurality of closure means for enclosing and sealing the interconnection end portions, the retaining means and the opposite extending intermediate armored jacket portions, and the intermediate opening; and
   gasket means for restraining, strengthening and further sealing the respective intermediate armored jacket and closure means over associated retaining means.

2. An armored interconnection as set forth in claim 1 wherein the optical fiber carrying means comprises the outer protective jacket, the intermediate armored jacket, and an inner fiber carrying jacket.

3. An armored interconnection as set forth in claim 1 wherein the retaining means comprise a retainer bead fitting over respective interconnection end portions and outer protective jacket of the interconnection.

4. An armored interconnection as set forth in claim 1 wherein the gasket means comprise an o-ring fitting over respective interconnection end portions, and the outer protective jacket of the interconnection and closure means.

5. An armored interconnection as set forth in claim 1 wherein the intermediate armored jacket comprises a stranded protective layer in which the strands separate in order to allow access to the optical fiber carrying means.

6. An armored interconnection as set forth in claim 1 wherein the closure means comprise lengths of shrink tubing.

7. An armored interconnection as set forth in claim 1 wherein the interconnection length between retaining means is approximately 1.8 times the distance between a free length of the fiber optic cable.

8. An armored interconnection for an optic fiber cable, comprising:
   a multi-layer service loop including a plurality of protective layers;
   the protective layers comprising:
      an inner fiber carrying jacket,
      an outer protective jacket, and
      an intermediate jacket of a stranded armor material;
   opposite lengths of spliced fiber optic cable entering the service loop from opposing service loop ends and having a splice enclosed within the service loop and the inner fiber optic carrying jacket;
   one service loop end portion assembly, the assembly comprising an end portion of the intermediate armored jacket folded over the associated end of the service loop, thereby forming a sealed multiple layer end assembly comprising a double armored jacket and an outer protective jacket;
   another service loop end portion assembly, the other assembly comprising another end portion of the intermediate armored layer folded over the associated other end of the service loop, thereby forming a sealed multiple layer end assembly comprising another double armored jacket and another outer protective jacket;
   one retainer bead enclosed within the one service loop end portion assembly;
   another retainer bead enclosed within the other service loop end portion assembly;
   closure means for each service loop end assembly, the closure means enclosing and sealing therein the intermediate armored jacket and retaining bead of the respective service loop end assemblies; and
   gasket means for each service loop end assembly, the gasket means restraining and further sealing respective closure means over each double layered intermediate armored jacket and outer protective jacket.

9. An armored interconnection as set forth in claim 8 further comprising:
   an opening defined by the outer protective jacket of the service loop, the opening located intermediate the ends of the service loop; and
   another closure means for the enclosing and sealing the protective jacket opening.

10. An armored interconnection as set forth in claim 9 wherein the other closure means is a shrinkable tubing.

11. An armored interconnection as set forth in claim 8 wherein the closure means are portions of a shrinkable tubing.

12. An armored interconnection as set forth in claim 8 wherein the gasket means comprise a plurality of o-rings.

13. An armored interconnection as set forth in claim 8 wherein the inner fiber carrying jacket is Hytrel brand material or equivalent.

14. An armored interconnection as set forth in claim 8 wherein the intermediate armored jacket is a Kevlar brand stranded material or equivalent stranded tubular armored material.

15. An armored interconnection as set forth in claim 8 wherein the outer protective jacket is a polyurethane material or equivalent.

16. An armored interconnection as set forth in claim 8 further comprising:
   a pair of wound fiber optic cable portions with the armored interconnection intermediate the wound portions, spaced apart a fixed distance;
   the distance between retainer beads on the respective ends of the armored interconnection is approximately 1.8 times the distance between a free length of the fiber optic cable between the wound portions.

17. An armored interconnection as set forth in claim 16 wherein the wound portions of fiber optic cable are bobbins of wound fiber optic cable suitable for use in association with a weapon payout system and the free length of fiber optic cable is measured between the bobbins fixed in place for use in the weapon system.

18. A method of constructing an armored interconnection for joining two free ends of optical fiber extending between two housings having separate bobbins containing wound optical fiber, comprising the steps of:

determining an appropriate length for an armored interconnection extending between said housings and comprising an inner fiber carrying jacket, an outer protective jacket, and an intermediate jacket of a stranded armored material, the appropriate length determined by the distance between a free length of an optic fiber cable;

slitting the outer protective jacket intermediate opposing ends of the length of the armored interconnection;

exposing the inner fiber carrying jacket;

threading gasket members over the ends of the outer protective jacket of the armored interconnection;

threading a plurality of closure members over the ends of the outer protective jacket of the armored interconnection;

threading retaining bead members over the ends of the outer protective jacket of the armored interconnection;

bisecting the inner fiber carrying jacket and the optical fiber pre-disposed therein;

removing the bisected pre-disposed optical fiber from said inner fiber carrying jacket, inserting the two free ends op optical fibers from the bobbins into the inner fiber carrying jacket until they emerge from the bisected ends of said jacket through the slit in the outer protective jacket;

splicing the opposing ends of the optic fiber extending through said slit;

pulling the spliced fiber back into the armored interconnection;

enclosing the slit in the outer protective jacket with a protective closure;

exposing the ends of the intermediate jacket of armored strands;

folding exposed ends of the intermediate armored jacket towards the opposing ends of the armored interconnection and over the protective outer jacket and respective retaining bead members;

enclosing and sealing the double layer of intermediate armored jacket and outer protective jacket and retaining bead members with proximate closure members of the respective ends of the armored interconnection; and placing respective gasket members in abutting and sealing relationship with the enclosed end portions of the armored interconnection.

* * * * *